United States Patent
Jillela et al.

(10) Patent No.: US 10,192,103 B2
(45) Date of Patent: Jan. 29, 2019

(54) SYSTEM AND METHOD FOR DETECTING AND REMOVING OCCLUSIONS IN A THREE-DIMENSIONAL IMAGE

(71) Applicant: Digital Signal Corporation, Chantilly, VA (US)

(72) Inventors: Raghavender Reddy Jillela, Herndon, VA (US); Trina D. Russ, Fairfax, VA (US)

(73) Assignee: StereoVision Imaging, Inc., Pasadena, CA (US)

( * ) Notice: Subject to any disclaimer, the term of this patent is extended or adjusted under 35 U.S.C. 154(b) by 0 days.

(21) Appl. No.: 15/405,424

(22) Filed: Jan. 13, 2017

(65) Prior Publication Data
US 2017/0344807 A1   Nov. 30, 2017

Related U.S. Application Data

(60) Provisional application No. 62/279,089, filed on Jan. 15, 2016.

(51) Int. Cl.
G06K 9/00   (2006.01)
G06T 19/20  (2011.01)
G06K 9/46   (2006.01)

(52) U.S. Cl.
CPC ..... *G06K 9/00255* (2013.01); *G06K 9/00281* (2013.01); *G06K 9/00288* (2013.01); *G06K 9/4609* (2013.01); *G06T 19/20* (2013.01)

(58) Field of Classification Search
CPC ......... G06K 9/00255; G06K 9/00281; G06K 9/00288; G06K 9/4609; G06T 19/20
USPC ........................................ 382/118
See application file for complete search history.

(56) References Cited

U.S. PATENT DOCUMENTS

2015/0234942 A1*  8/2015  Harmon ................ G06F 17/50
                                                                                           700/98
2017/0032179 A1*  2/2017  Al-Qunaieer ...... G06K 9/00288

* cited by examiner

Primary Examiner — Ping Y Hsieh
(74) Attorney, Agent, or Firm — Toering Patents PLLC

(57) ABSTRACT

A system and method for performing facial recognition is described. In some implementations, the system and method identify points of a three-dimensional scan that are associated with occlusions, such as eyeglasses, to a face of a target subject and remove the identified points from the three-dimensional scan.

18 Claims, 15 Drawing Sheets

SYSTEM AND METHOD FOR DETECTING AND REMOVING OCCLUSIONS IN A THREE-DIMENSIONAL IMAGE

CROSS-REFERENCE TO RELATED APPLICATIONS

This Application claims priority to U.S. Provisional Application No. 62/279,089, which was filed on Jan. 15, 2016, and entitled "System and Method for Detecting and Removing Occlusions in a Three-Dimensional Image." The foregoing application is incorporated herein by reference in its entirety.

FIELD OF THE INVENTION

The invention is generally related to face recognition techniques, and more particularly, to detecting and removing occlusions within a three-dimensional image.

BACKGROUND OF THE INVENTION

Some face recognition systems often use three-dimensional sensors to acquire facial information. These 3D sensors include, but are not limited to, lidar systems (i.e., laser radar), structured light sensors, RGB-D cameras, and other three-dimensional sensors. Such three-dimensional sensors (or other remote sensing technologies) record light reflected from an illuminated target to facilitate the identification of the illuminated target (e.g., a human subject, etc.). Typical face recognition systems may generate three-dimensional ("3D") scans (sometimes also referred to as 3D images) of the subjects based on information acquired and/or measured during a sensor scan, such as 3D scans of a target subject's face and/or aspects of the target subject's face. The typical face recognition systems may perform various comparisons between the generated 3D scan and 3D scans or other images of previously acquired or known subjects in order to identify subjects.

Three-dimensional scans of subjects are perceived to provide better face recognition ("FR") performance than two-dimensional ("2D") images. This is because 3D scans, unlike 2D images, include depth information of a surface of the subject's face. Additionally, some 3D sensors, such as lidar systems, are typically more resilient to illumination and distance than typical 2D sensors (e.g., cameras, video cameras, etc.).

Even so, performance of 3D facial recognition systems can be negatively impacted by a varying degree due to several factors, one of which is facial occlusion. Depending on the environment under which a 3D scan is acquired, some commonly observed occlusions include, but are not limited to: hands, eyeglasses, hats, scarves, cellphones, hair, etc.

Detecting such occlusions in 2D images may be less challenging than doing so in 3D scans. This is because various texture processing techniques may be utilized to classify skin, facial hair, and non-skin region(s) in the 2D images. However, such texture information is typically not available in 3D scans.

What is needed is an improved system and method for detecting and removing occlusions in a three-dimensional scan.

SUMMARY OF THE INVENTION

Various implementations of the invention perform and/or assist in face recognition processes by detecting an occlusion in a three-dimensional scan, identifying three-dimensional points in the three-dimensional ("3D") scan that are associated with the occlusion, and removing the identified three-dimensional points from the 3D scan. In addition, some implementations of the invention replace or fill the removed three-dimensional points with facial symmetry information, or other information from surrounding points in the 3D scan to generate a holistic, full face representation.

In various implementations of the invention, a three-dimensional scan that includes a face of the target subject is received. In some implementations of the invention, the three-dimensional scan comprises a plurality of three-dimensional points. In various implementations of the invention, a subset plurality of three-dimensional points is determined to be associated with an occlusion to the face of the target subject. In various implementations of the invention, the subset plurality of three-dimensional points corresponding to the occlusion of the face of the target subject is removed from the three-dimensional scan. In various implementations of the invention, the three-dimensional scan is subsequently reconstructed to compensate for the removed subset plurality of three-dimensional points. In various implementations of the invention, once the subset of the plurality of points is removed, the three-dimensional scan is compared against a known image using various facial recognition techniques. In various implementations of the invention, the occlusion is a pair of eyeglasses.

These implementations, their features and other aspects of the invention are described in further detail below.

DETAILED DESCRIPTION

Figure 1A:
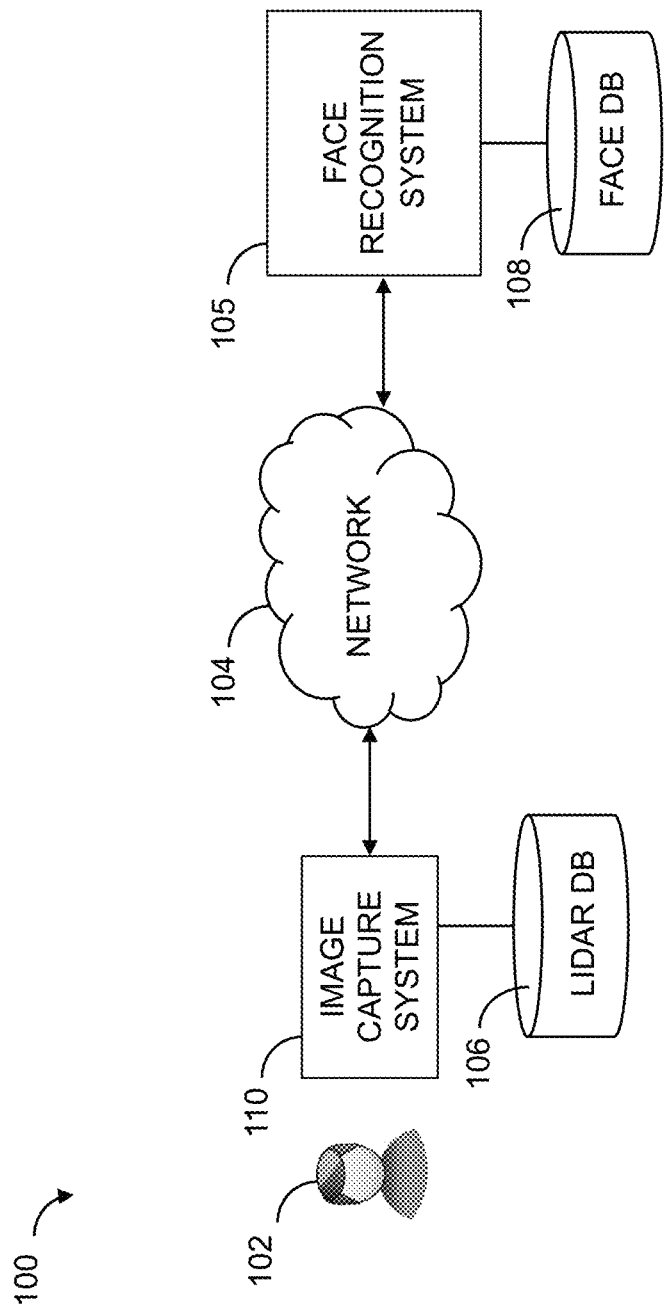
FIG. 1A illustrates a suitable computing environment for performing various face recognition techniques according to various implementations of the invention.

As described herein, in some implementations of the invention, the systems and methods facilitate the recognition of target subjects using lidar-based scanning and/or 3D imaging techniques (e.g., structured light, stereo, etc.). FIG. 1A illustrates a suitable computing environment 100 for performing various face recognition techniques according to various implementations of the invention.

In some implementations of the invention, computing environment 100 includes a 3D sensor 110 (e.g., a lidar system or lidar-based system or other 3D data acquisition system) that acquires information, images, and/or other data from a target subject 102. In some implementations of the invention, 3D sensor may generate a representation of target subject 102, including a three-dimensional ("3D") scan and a two-dimensional ("2D") image of target subject 102. In some implementations of the invention, 3D sensor 110 may include and/or be associated with a database 108, such as a database that stores and/or includes information, such as, but not limited to 2D images, distance measurements, coordinates, location or distance maps, and other information.

A face recognition system 105 may communicate with 3D sensor 110 over a wired or wireless network 104, such as, but not limited to, the Internet. Face recognition system 105 may compare a representation from 3D sensor 110 to representations of known subjects, such as representations stored in database 108, and recognize or otherwise identify target subject 102 based on the comparison.

FIG. 1A and the discussion herein provide a brief, general description of a suitable computing environment in which various implementations of the invention can be supported and implemented. Although not required, various implementations of face recognition system 105 are described in the general context of computer-executable instructions, such as routines executed by a general-purpose computer, e.g., mobile device, a server computer, or personal computer. Those skilled in the relevant art will appreciate that various implementations of the invention can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Various implementations of the invention may be embodied in a special purpose computing device or data processor that is specifically programmed, configured, or constructed to perform one or more of the computer-executable instructions explained in detail herein. Various implementations of the invention may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Various implementations of the invention may be stored or distributed on computer-readable media (e.g., physical and/or tangible computer-readable storage media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of various implementations of the invention may reside on a server computer, while corresponding portions reside on a client computer such as a mobile or portable device, and thus, while certain hardware platforms are described herein, aspects of various implementations of the invention are equally applicable to nodes on a network. In various implementations, the mobile device or portable device may represent the server portion, while the server may represent the client portion.

Figure 1B:
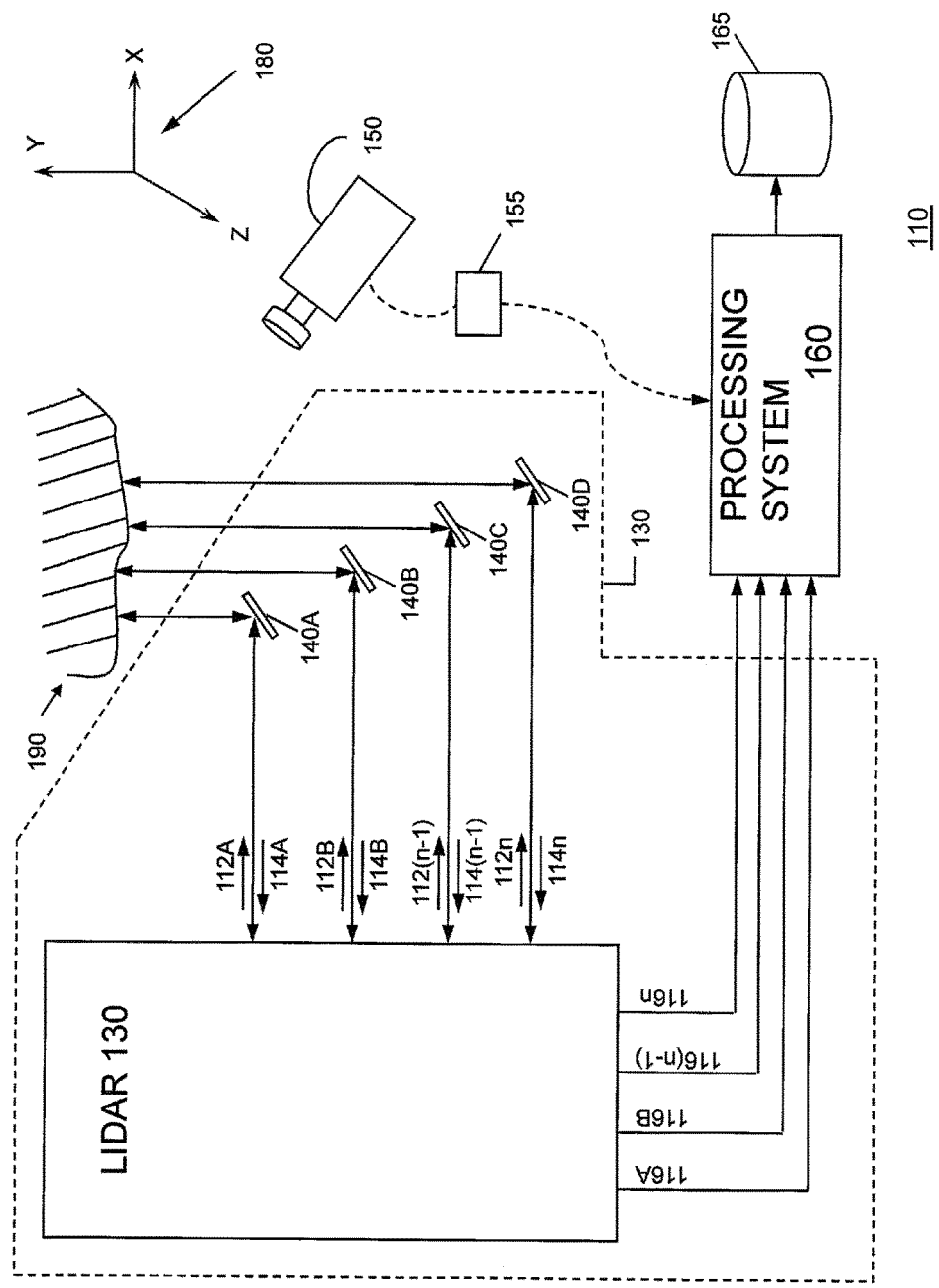
FIG. 1B illustrates a three-dimensional sensor, specifically a combined lidar and video camera system, according to various implementations of the invention.

FIG. 1B illustrates a 3D sensor 110 according to various implementations of the invention. As illustrated, 3D sensor 110 comprises a lidar 130 and video camera 150, though other 3D sensors may also be used as would be appreciated. Various implementations of the invention utilize synergies between lidar measurements (e.g., 3D scans) from lidar 130 and video images (e.g., 2D images) to resolve six degrees of freedom for motion of a target to a degree not otherwise possible with either lidar 130 or video camera 150 alone. Some implementations of the invention may utilize portions of 3D sensor 110 illustrated in FIG. 1B, such as lidar 130 without video camera 150.

3D sensor 110 includes lidar subsystem 130, video subsystem 150, and a processing system 160. As illustrated, lidar subsystem 130 includes two or more lidar beam outputs 112 (illustrated as a beam 112A, a beam 112B, a beam 112(n−1), and a beam 112n); two or more reflected beam inputs 114 each corresponding to one of beams 112 (illustrated as a reflected beam 114A, a reflected beam 114B, a reflected beam 114(n−1), and a reflected beam 114n); two or more lidar outputs 116 each associated with a pair of beam 112/reflected beam 114 (illustrated as a lidar output 116A associated with beam 112A/reflected beam 114A, a lidar output 116B associated with beam 112B/reflected beam 114B, a lidar output 116(n−1) associated with beam 112(n−1)/reflected beam 114(n−1), and a lidar output 116n associated with beam 112n/reflected beam 114n).

In some implementations of the invention, beam steering mechanism 140 may be employed to steer one or more beams 112 toward target 190. In some implementations of the invention, beam steering mechanism 140 may include individual steering mechanisms, such as a steering mechanism 140A, a steering mechanism 140B, a steering mechanism 140C, and a steering mechanism 140D, each of which independently steers a beam 112 toward target 190. In some implementations of the invention, one beam steering mechanism 140 may independently steer pairs or groups of beams 112 toward target 190.

In some implementations of the invention, beam steering mechanism 140 may include one or more mirrors, each of which may or may not be separately controlled, each mirror steering one or more beams 112 toward target 190. In some implementations of the invention, beam steering mechanism 140 may directly steer an optical fiber of beam 112 without use of a mirror. In some implementations of the invention, beam steering mechanism 140 may be controlled to steer beams 112 in azimuth and/or elevation. Various techniques may be used by beam steering mechanism 140 to steer beam(s) 112 toward target 190 as would be appreciated.

In some implementations of the invention, beam steering mechanism 140 may be used to control both an azimuth angle and an elevation angle of two beams 112 toward the target. By controlling both the azimuth angle and the elevation angle, the two beams 112 may be used to scan a volume for potential targets or track particular targets such as target 190. Other scanning mechanisms may be employed as would be apparent. In some implementations of the invention, the two beams 112 may be offset from one another. In some implementations of the invention, the two beams 112 may be offset vertically (e.g., in elevation) or horizontally (e.g., in azimuth) from one another by a predetermined offset and/or a predetermined angle, either of which may be adjustable or controlled.

In some implementations of the invention, beam steering mechanism 140 may be used to control both an azimuth angle and an elevation angle of four beams 112 toward the target. In some implementations, the four beams 112 may be arranged with horizontal and vertical separations. In some implementations, the four beams may be arranged so as to form at least two orthogonal separations. In some implementations, the four beams may be arranged in a rectangular pattern, with pairs of beams 112 offset from one another vertically and horizontally. In some implementations, the four beams may be arranged in other patterns, with pairs of beams 112 offset from one another. The separations of the four beams 112 may be predetermined offsets and/or predetermined angles, which may be fixed, adjustable and/or controlled.

A certain portion of each beam 112 may be reflected back from target 190 to lidar subsystem 130 as reflected beam 114. In some implementations of the invention and as illustrated in FIG. 1, reflected beam 114 follows the same optical path (though in reverse) as beam 112. In some implementations of the invention, a separate optical path may be provided in lidar subsystem 130 or in 3D sensor 110 to accommodate reflected beam 114.

In some implementations of the invention, lidar subsystem 130 receives a reflected beam 114 corresponding to each beam 112, processes reflected beam 114, and outputs lidar output 116 to processing system 160.

In some implementations of the invention, 3D sensor 110 also includes video subsystem 150. Video subsystem 150 may include a video camera for capturing two-dimensional images 155 of target 190. Various video cameras may be used as would be apparent. In some implementations of the invention, the video camera may output images 155 as pixels at a particular resolution and at a particular image or frame rate. Video images 155 captured by video subsystem 150 are forwarded to processing system 160. In some implementations of the invention, lidar subsystem 130 and video subsystem 150 are offset from one another in terms of position and orientation. In particular, lidar measurements typically correspond to three dimensions (e.g., x, y, and z) whereas video images typically correspond to two dimensions (e.g., x and y). Various implementations of invention calibrate lidar subsystem 130 with video subsystem 150 to ensure that data provided by each system refers to the same location in a given coordinate system as would be apparent.

In some implementations of the invention, 3D sensor 110 may include one or more optional video subsystems (not otherwise illustrated) for capturing additional two-dimensional images 155 of target 190 from different positions, perspectives or angles as would be apparent.

In some implementations of the invention, processing system 160 receives lidar outputs 116 from lidar subsystem 130 and images 155 from video subsystem 150 and stores them in a memory or other storage device 165 for subsequent processing. Processing system 160 processes lidar outputs 116 and images 155 to generate a three-dimensional image of target 190. In some implementations of the invention, processing system 160 determines a trajectory of target 190 from a combination of lidar outputs 116 and images 155 and uses the trajectory to generate a motion stabilized three-dimensional image of target 190.

In some implementations of the invention, lidar subsystem 130 may include, for each of beams 112, a dual frequency, chirped coherent laser radar system capable of unambiguously and simultaneously measuring both range and Doppler velocity of a point on target 190. Such a laser radar system is described in U.S. Pat. No. 7,511,824, entitled "Chirped Coherent Laser Radar System and Method," (the "Chirped Lidar Specification"), which is incorporated herein by reference in its entirety. For purposes of clarity, a "beam" referenced in the Chirped Lidar Specification is not the same as a "beam" referred to in this description. More particularly, in the Chirped Lidar Specification, two beams are described as output from the laser radar system, namely a first beam having a first frequency (chirped or otherwise) and a second beam having a second frequency (chirped or otherwise) that are simultaneously coincident on a point on a target to provide simultaneous measurements of both range and Doppler velocity of the point on the target. For purposes of simplicity and clarity, a singular "beam" as discussed herein may refer to the combined first and second beams output from the laser radar system described in the Chirped Lidar Specification. The individual beams discussed in the Chirped Lidar Specification are referred to herein henceforth as "signals." Nonetheless, various implementations of the invention may employ beams other than those described in the Chirped Lidar Specification.

As illustrated in FIG. 1B, a target coordinate frame 180 may be used to express various measurements associated with target 190. Various coordinate frames may be used as would be appreciated. In some implementations of the invention, various ones of the subsystems 130, 150 may express aspects of target 190 in coordinate frames other than target coordinate frame 180 as would be appreciated. For example, in some implementations of the invention, a spherical coordinate frame (e.g., azimuth, elevation, range) may be used to express measurements obtained via lidar subsystem 130. Also for example, in some implementations of the invention, a two-dimensional pixel-based coordinate frame may be used to express images 155 obtained via video subsystem 150. Various implementations of the invention may use one or more of these coordinate frames, or other coordinate frames, at various stages of processing as will be appreciated.

As would be appreciated, in some implementations of the invention, various coordinate transformations may be required to transform measurements from lidar subsystem 130, which may be expressed in a spherical coordinates with reference to lidar subsystem 130 (sometimes referred to as a lidar measurement space), to the motion aspects of target 190, which may be expressed in Cartesian coordinates with reference to target 190 (sometimes referred to as target space). Likewise, various coordinate transformations may be required to transform measurements from video subsystem 150, which may be expressed in Cartesian or pixel coordinates with reference to video subsystem 150 (sometimes referred to as video measurement space), to the motion aspects of target 190. In addition, measurements from combined system 100 may be transformed into coordinate frames associated with external measurement systems such as auxiliary video, infrared, hyperspectral, multispectral or other auxiliary imaging systems. Coordinate transformations are generally well known.

As would be appreciated, in some implementations of the invention, various coordinate transformations may be required to transform measurements from lidar subsystem 130 and/or video subsystem 150 to account for differences in position and/or orientation of each such subsystem 130, 150 as would be apparent.

Thus, in some implementations of the invention, a face recognition system 105 communicates with a lidar-based 3D sensor 110 to receive and/or access information captured from target subject 102, such as coordinates that form a three-dimensional image or scan that is representative of a face of target subject 102 and that are associated with various features of the face of target subject 102.

Figure 2:
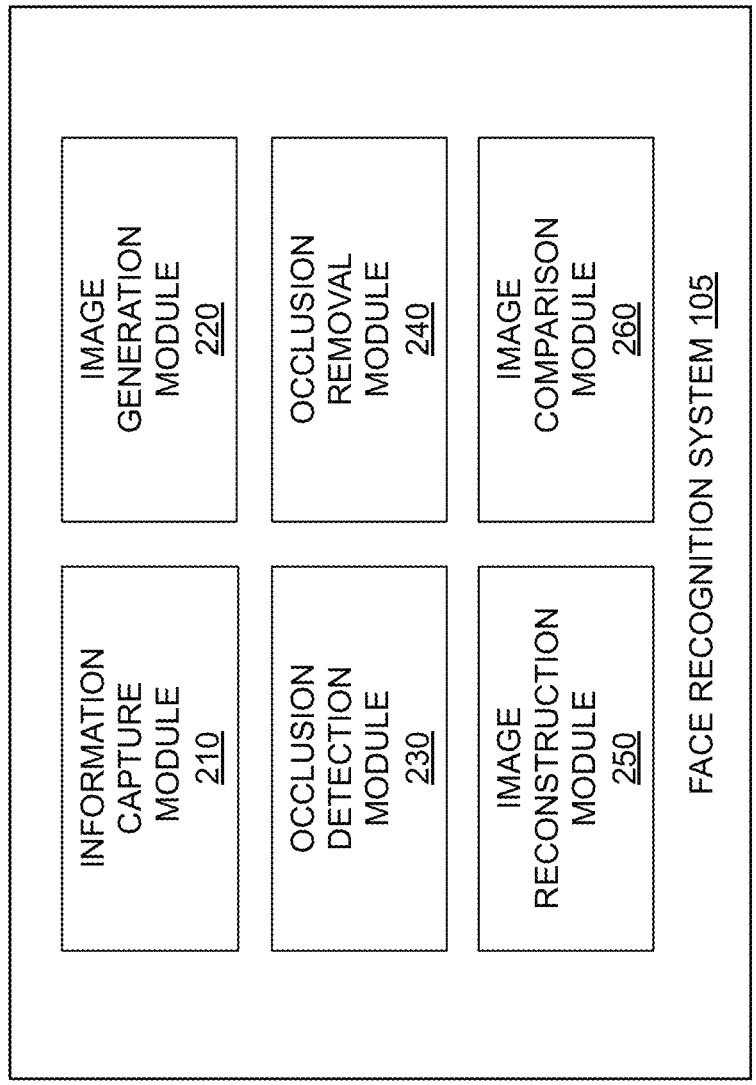
FIG. 2 illustrates a block diagram of components of a face recognition system according to various implementations of the invention.

FIG. 2 illustrates a block diagram of components of face recognition system 105 according to various implementations of the invention. Face recognition system 105 includes a variety of components or modules, such as an information capture module 210, an image generation module 220, an occlusion detection module 230, an occlusion removal module 240, and/or an image comparison module 260. These components or modules may be implemented with a combination of software (e.g., executable instructions, or computer code) and hardware (e.g., at least a memory and processor) as would be appreciated. Accordingly, as used herein, in some examples a module is a processor-implemented module and represents a computing device having a processor that is configured and/or programmed by executable instructions stored in memory to implement the corresponding operation of the module as described herein.

In some implementations of the invention, information capture module 210 may be configured to receive, access, and/or capture three-dimensional information, such as a 3D scan, from a face of target subject 102. In some implementations of the invention, such information may be acquired or otherwise captured by 3D sensor 110. For example, information capture module 210 may receive and/or access coordinate information (e.g., coordinates or other representations of points in three-dimensional space) that is acquired and/or measured by lidar subsystem 130 of 3D sensor 110 (or other 3D sensors).

In some implementations of the invention, image generation module 220 is configured to generate a 3D image from the 3D scan of target subject 102. For example, image generation module 220 may generate a three-dimensional image by building an image or map of the 3D scan representative of various different features of a face of target subject 102.

In some implementations of the invention, occlusion detection module 230 is configured to determine that the generated 3D image includes one or more coordinates associated with aspects of an occlusion (e.g., a non-facial object) proximate to the face of target subject 102. For example, occlusion detection module 230 may determine that the generated 3D image includes coordinates associated with, for example, eyeglasses or portions of eyeglasses (e.g., frames, shaded lenses, attached communication devices, and other portions of eyeglasses) worn on the face of target subject 102.

Occlusion detection module 230 may perform various techniques to determine that the 3D image includes coordinates associated with the occlusion(s). For example, occlusion detection module 230 may receive an indication that a 2D image of target subject 102 depicts eyeglasses worn on the face of target subject 102, may detect one or more coordinates within the 3D image as being indicative of eyeglasses or other non-facial objects, may receive an indication from an operation of 3D sensor 110 (e.g., a human screener of subjects), and so on.

In some implementations of the invention, occlusion removal module 240 is configured to remove the coordinates associated with the occlusion to the face of target subject 102, in order to modify the 3D image that is representative of the face of target subject 102 and/or otherwise generate a 3D image of target subject 102 that does not include artifacts or other misleading or unusable information associated with the occlusion.

Figure 14:
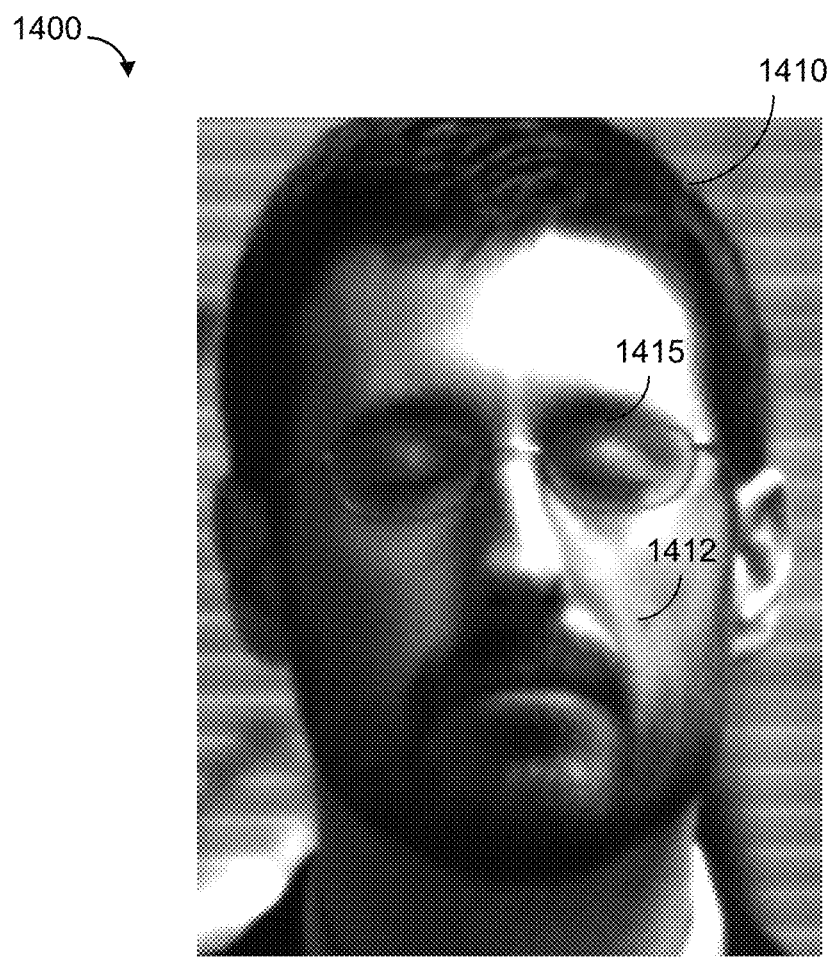
FIG. 14 illustrates a common occlusion, namely a pair of eyeglasses worn on a face of a target according to various implementations of the invention.

As illustrated in FIG. 14, occlusion removal module 240 may determine that the occlusion is a pair of eyeglasses 1415 worn on a face 1412 of target subject 1410, for example, identify coordinates associated with a frame of the eyeglasses 1415, and remove the identified coordinates. Because eyeglasses are a common source of occlusion that may impede face recognition performance in both 2D and 3D domains, various implementations of the invention are now described in a context of detecting and removing eyeglasses from a 3D image; however, these implementations may be extended to detecting and removing other occlusions as will become apparent.

Eyeglasses, when worn and depending upon their type (e.g., sunglasses or those with thick frames), may significantly reduce an amount of necessary information required for successful face recognition. For example, eyeglasses typically occlude an ocular region of the face of target subject 102. Existing research suggests that this ocular information is important for achieving reliable performance of various facial recognition techniques—any irregularities within the ocular region can significantly degrade performance.

Eyeglasses are more common than expected, particularly in uncontrolled environments. Humans use various types of eyeglasses for different reasons, not just for vision correction. Depending on their purpose, eyeglasses can be broadly classified into the following categories: 1) prescription eyeglasses for corrective vision; 2) sunglasses for outdoor purposes; 3) eyeglasses for aesthetic purposes; and/or 4) protective eyewear. Depending on the size of the frames that hold the lens, eyeglasses can be categorized as: 1) thin frames; 2) thick frames; or 3) no frames. Furthermore, many lenses employ coatings which also present challenges: 1) reflective coatings which may completely occlude the ocular region behind the eyeglasses; and 2) anti-reflective coatings, which may allow lidar 130 to obtain only partial, or noisy measurements behind the lenses. In such cases, the ocular region information may not be completely present, causing gaps (or holes) in an underlying facial representation associated with the 3D scan.

Simple techniques based, for example, on median filtering of scan points, may be leveraged to identify and remove eyeglasses. These approaches will typically provide improved face recognition performance when compared with no identification or removal of the eyeglasses. However, such techniques fail to differentiate between scan points that correspond to noise versus those that correspond to points on the eyeglasses. In addition, such techniques may only be effective in removing very thin glasses frames and may not sufficiently remove scan points that may lie on the lenses. Such techniques also trigger inconsistently—that is, triggering when no eyeglasses are present, or not triggering when eyeglasses are present.

Various implementations of the invention employ an occlusion model to overcome these deficiencies. The occlusion model may be used to detect and remove common types of occlusions where removing too many or too few scan points associated with the occlusion may negatively impact subsequent facial recognition performance. Various implementations of the invention rely on a premise that scan points associated with the occlusion may be expressed as a mathematical model. In implementations where the occlusion is eyeglasses: 1) scan points associated with the eyeglasses may lie on a surface that may be expressed mathematically; and 2) scan points on the eyeglasses are roughly bound by two ellipses: a first ellipse that encompasses a left frame and lens of the eyeglasses, and a second ellipse that encompasses a right frame and lens of the eyeglasses. Various implementations of the invention remove, as eyeglasses, only those scan points in the 3D scan that satisfy one or both of these conditions. This may be accomplished by modeling the surface (i.e., plane fitting, surface fitting, ellipse fitting) and then subsequently removing those points that conform to the model (i.e., lie close to the plane or surface) and within the respective perimeters of the fitted ellipses.

Further, once the scan points corresponding to eyeglasses frames and lenses are removed, various implementations of the invention reconstruct any missing regions in the 3D scan. This is because such missing regions, particularly in the ocular region, can dramatically impact face recognition performance.

Figure 3A:
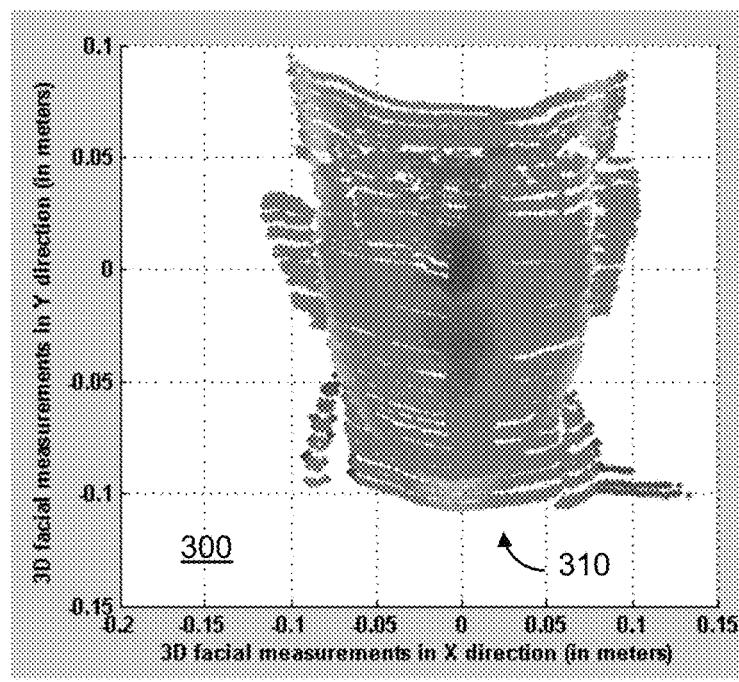
FIG. 3A illustrates a pose-normalized three-dimensional scan obtained from a 3D system according to various implementations of the invention.
Figure 3B:
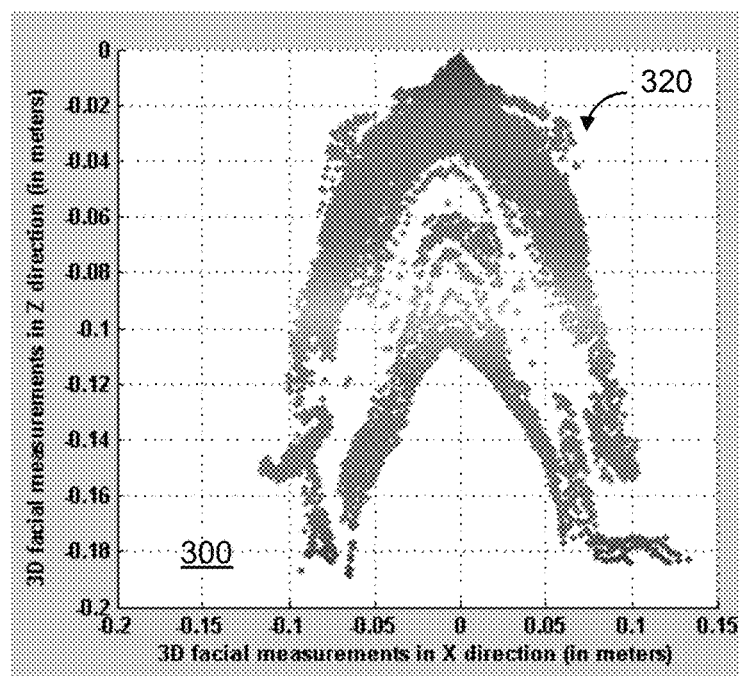
FIG. 3B illustrates a pose-normalized three-dimensional scan obtained from a 3D system from a different view point than that of FIG. 3A, according to various implementations of the invention.

FIGS. 3A and 3B illustrate pose-normalized 3D scans of target subject 102 obtained from lidar system 130 according to various implementations of the invention. FIG. 3A illustrates a frontal view 310 of a pose-normalized 3D scan 300 and FIG. 3B illustrates a different view 320 of the same pose-normalized 3D scan 300. For purposes of this description, a pose-normalized scan is a collection of three-dimensional points (also referred to as a point cloud) corresponding to a face that is placed in a standardized pose. In some implementations of the invention, a pose-normalized scan may be a collection of three-dimensional points corresponding to the face that is placed in a standardized pose. In some implementations of the invention, a pose-normalized scan may be a collection of three-dimensional points corresponding to the face that is placed in a standardized pose, with a standard or otherwise predetermined number of points. In such implementations of the invention, the pose-normalized scan may be generated by deforming a standardized face model to fit the three-dimensional points in the 3D scan obtained from lidar or other 3D sensor systems 130 as would be appreciated. In some implementations of the invention, a spatial filter may be applied to the pose-normalized scan to remove those three-dimensional points not associated with the face. For example, an elliptical spatial filter, centered, for example, on the nose of the face, maybe applied to the three-dimensional points to pass those points within the elliptical spatial filter and eliminate those points outside the elliptical spatial filter. As illustrated in FIGS. 3A and 3B, differences in gray scale in the images correspond to different depths of the face as measured by lidar system 130.

Figure 4:
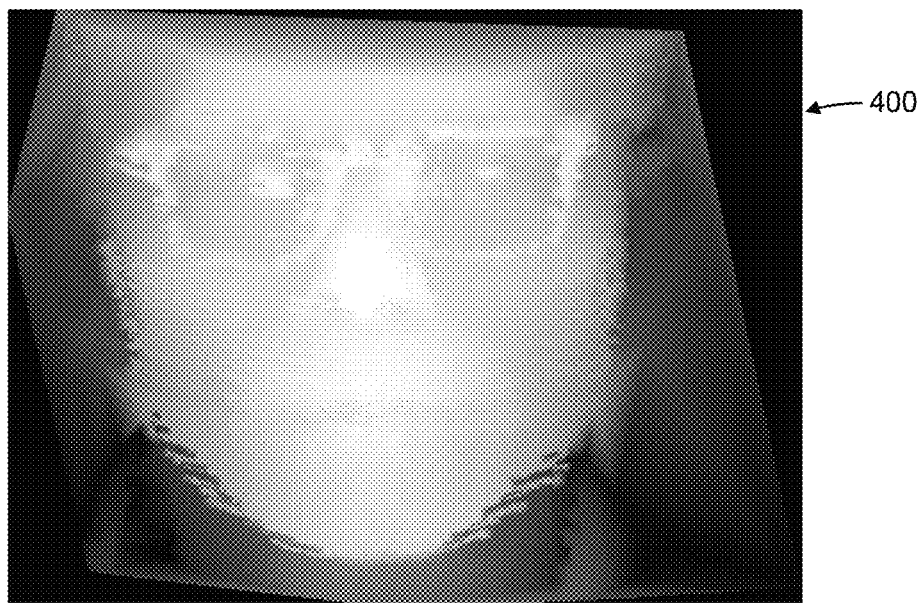
FIG. 4 illustrates a two-dimensional depth image corresponding to a pose-normalized three-dimensional scan according to various implementations of the invention.

According to various implementations of the invention, pose-normalized scan 300 is converted to a 2D depth image 400 such as that illustrated in FIG. 4. The 2D depth image 400 illustrates differences in range (or depth) of the points via grey scale. Converting pose-normalized scan 300 to 2D depth image 400 reduces a computational effort involved in detecting edges and contours of interest in pose-normalized scan 300.

Figure 5:
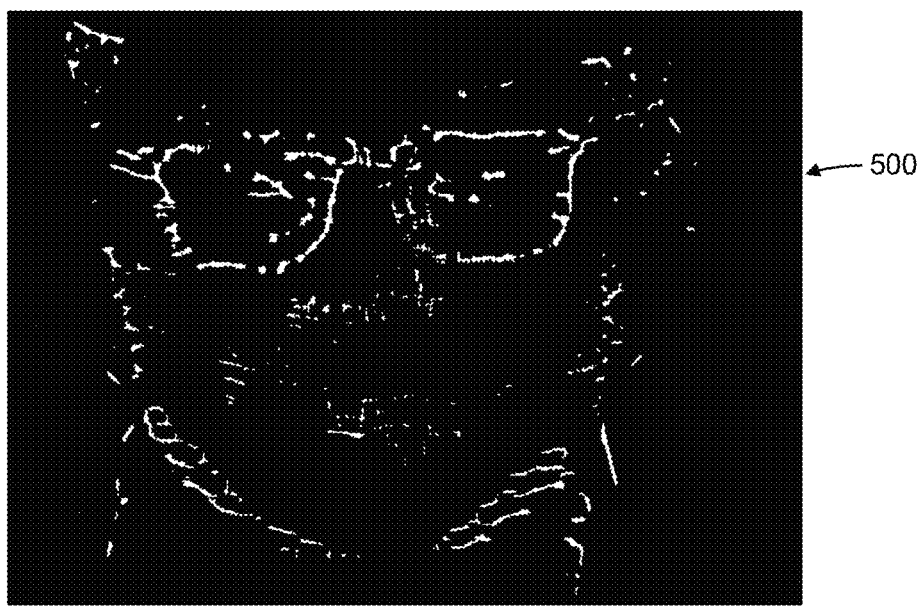
FIG. 5 illustrates a two-dimensional edge image including various edge points detected in a two-dimensional depth image according to various implementations of the invention.

According to various implementations of the invention, 2D depth image 400 undergoes edge detection processing. Edge detection identifies those locations or regions in 2D depth image 400 that exhibit sharp variations in surface contour as would be appreciated. Edge detection determines various edge points (including peak points) within 2D depth image 400. FIG. 5 illustrates a 2D edge image 500 including various highlighted edge points detected in 2D depth image 400 according to various implementations of the invention.

Figure 6:
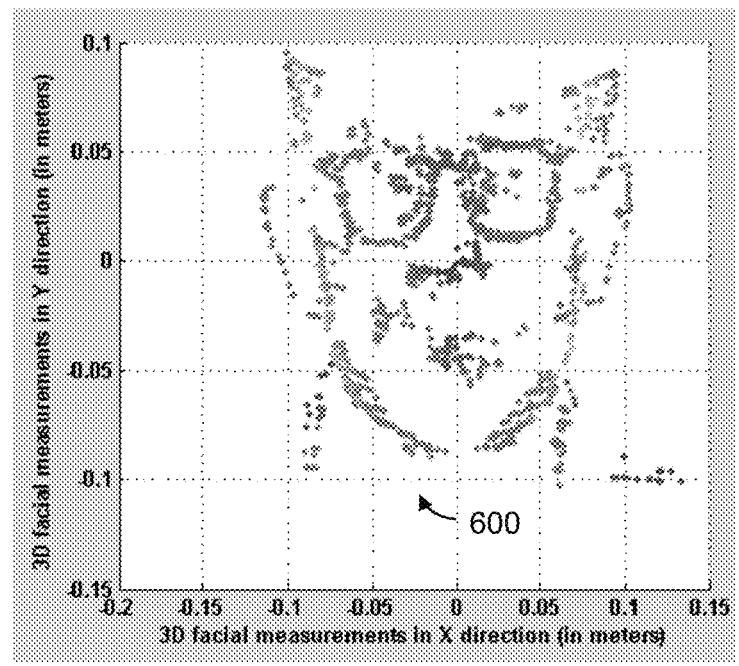
FIG. 6 illustrates a pose-normalized three-dimensional edge scan including those points that correspond to the edges in the two-dimensional edge image of FIG. 5 according to various implementations of the invention.

According to various implementations of the invention, edge points from 2D edge image 500 are mapped back to their corresponding scan points in pose-normalized 3D scan 300. For purposes of occlusion removal, all other scan points in pose-normalized 3D scan 300 are discarded leaving the resulting 3D edge points 600 as illustrated in FIG. 6.

Figure 7:
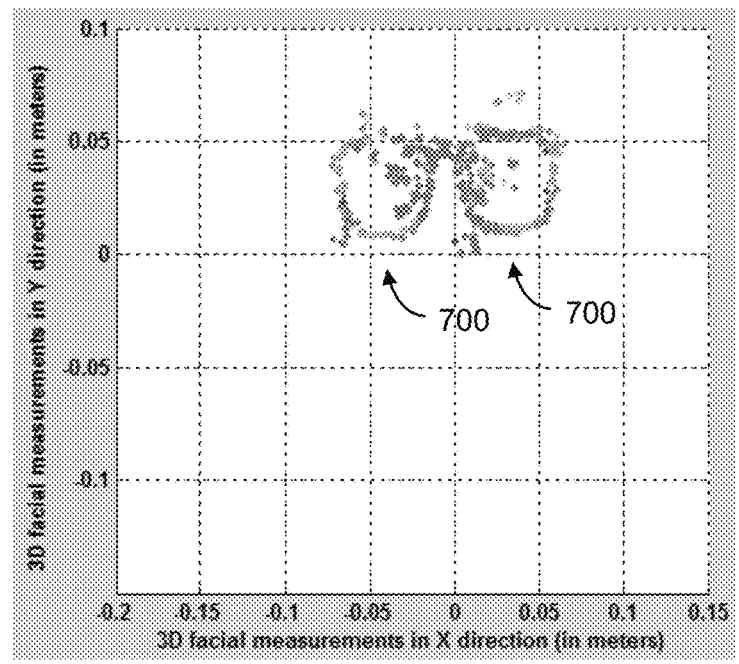
FIG. 7 illustrates those three-dimensional edge points from the three-dimensional edge scan that are included in an ocular region of interest according to various implementations of the invention.

According to various implementations of the invention, 3D edge points 600 are filtered to retain only those points that lie within the ocular region of the face of target subject 102. Such filtering may be accomplished via heuristic techniques and knowledge of a location of a nose on the face of target subject. In some implementations of the invention, the nose is determined as part of the pose-normalization process of 3D scan 300. In some implementations of the invention, the nose may be detected by other processing as would be appreciated. This filtering results in identifying those 3D edge points included in one or more ocular regions of interest 700 as illustrated in FIG. 7.

According to various implementations of the invention, filtered 3D edge points 600 within ocular regions of interest 700 may be used to fit an occlusion model that may be used to define filtered 3D edge points 600. In some implementations, a surface fitting approach may be used to determine a surface for the occlusion model that maximizes a number of filtered 3D edge points that fit on or near the surface. Such a surface may correspond to a plane, a three-dimensional surface (e.g., a surface with some curvature, etc.) or other higher-order surface. In some implementations, the occlusion model may rely on a RANSAC based plane fitting approach which may be suitable for eyeglasses with minimal curvature. Additionally, other higher order surface model fitting techniques may be used to model the eyeglasses as would be appreciated.

In some implementations of the invention, the occlusion model (i.e., a plane, a surface, or other model) may not include all of the filtered 3D edge points within ocular region of interest 700 due to, for example, noise, motion blur, or other factors as would be appreciated. Accordingly, in some implementations a predetermined distance threshold, d, may be used to include additional points that fall within +/−d of the occlusion model. In some implementations of the invention, two bounding surfaces (or planes) may be determined: a first bounding surface (or plane) that is +d from the occlusion model and second bounding surface (or plane) that is −d from the occlusion model. In these implementations of the invention, a majority, if not all, of the filtered 3D edge point within ocular region of interest 700 may be included within or between the two bounding surfaces or planes.

Figure 8A:
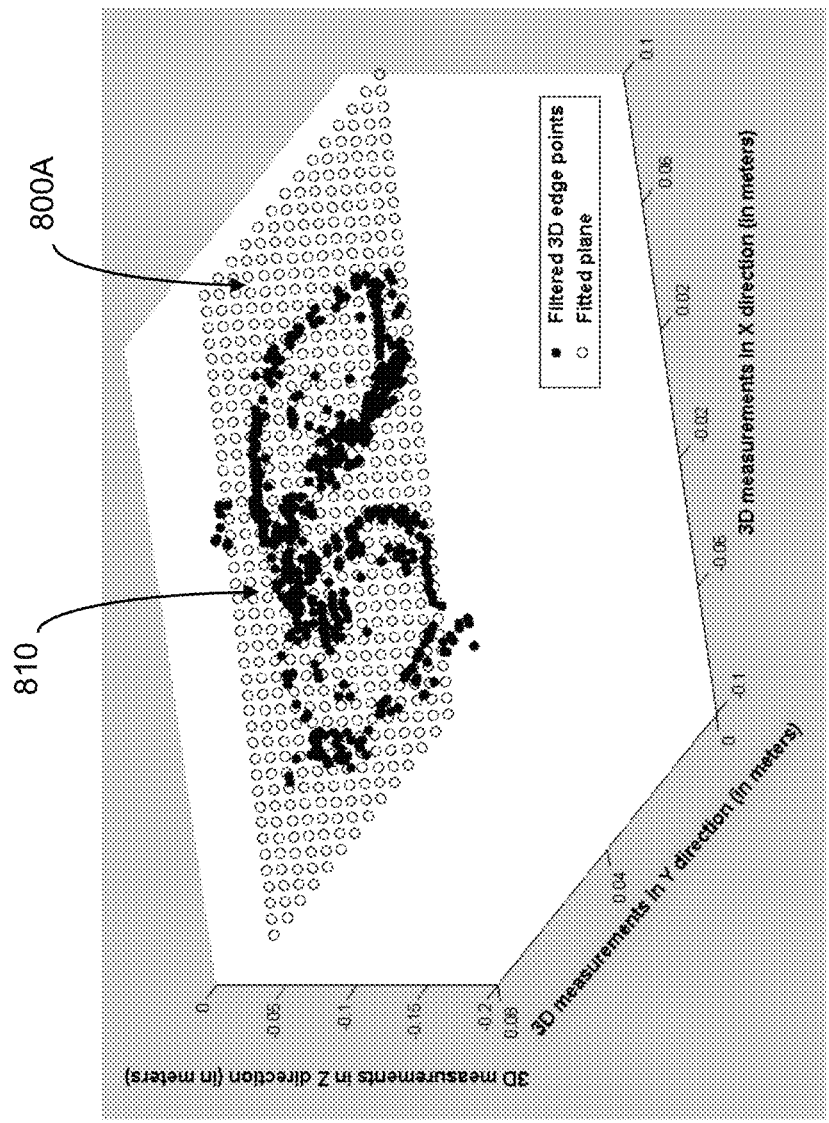
FIG. 8A illustrates those three-dimensional edge points that are used to fit an occlusion model comprising a plane according to various implementations of the invention.
Figure 8B:
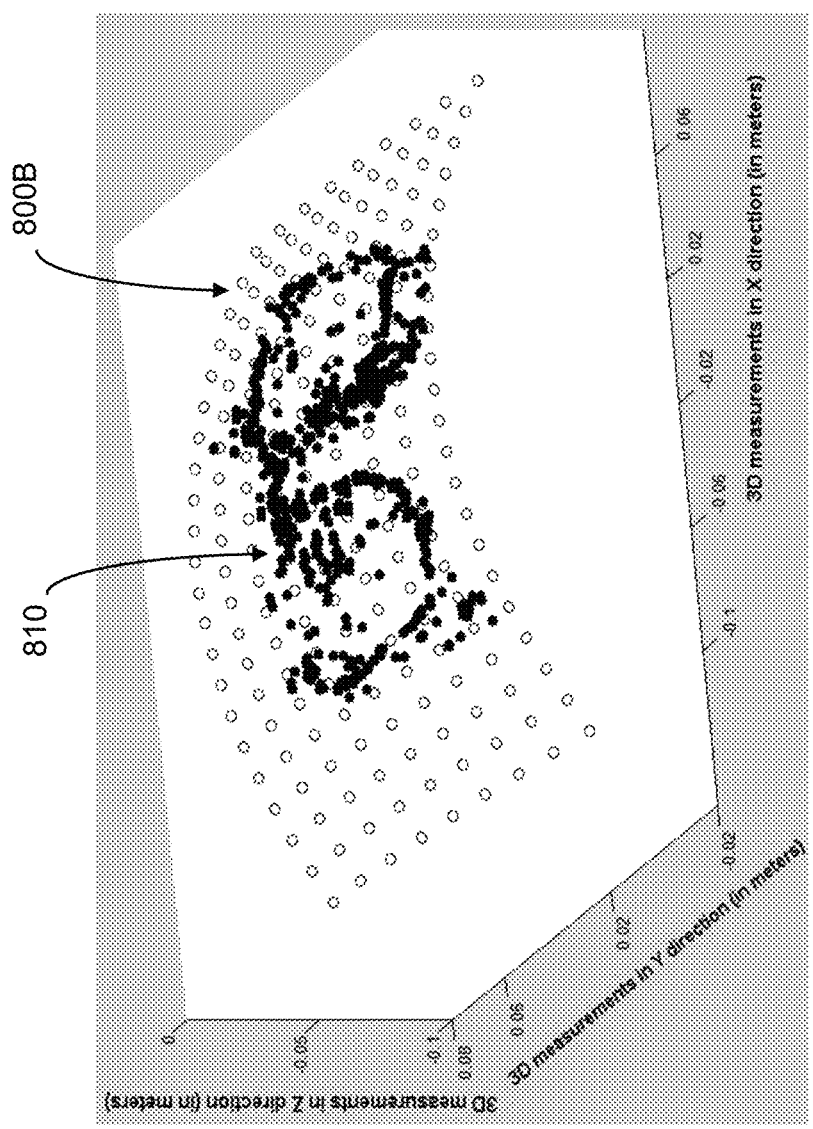
FIG. 8B illustrates those three dimensional edge points that are used to fit an occlusion model comprising a surface according to various implementations of the invention.
Figure 9:
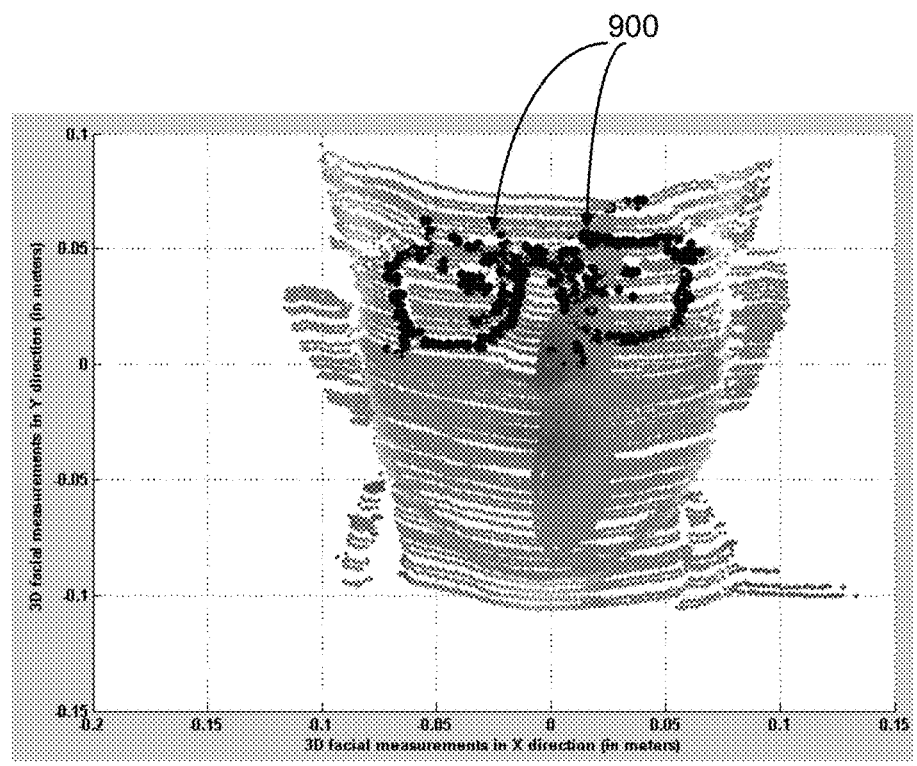
FIG. 9 illustrates those three-dimensional edge points that conform to the occlusion model (i.e., lie on or close to the plane, the surface, etc.) according to various implementations of the invention.

FIG. 8A illustrates filtered 3D edge points 810 that fit an occlusion model corresponding to a reference plane 800A (or in some implementations, on or between boundary planes on either side of reference plane 800A) according to various implementations of the invention. FIG. 8B illustrates filtered 3D edge points 810 that fit an occlusion model corresponding to a reference surface 800B (or in some implementations, on or between boundary surfaces on either side of the reference surface). In either illustration, these edge points 810 correspond to potential eyeglasses points that reside within 3D scan 300. These potential eyeglasses points 900 are subsequently highlighted in 3D scan 300 as illustrated in FIG. 9.

Figure 10:
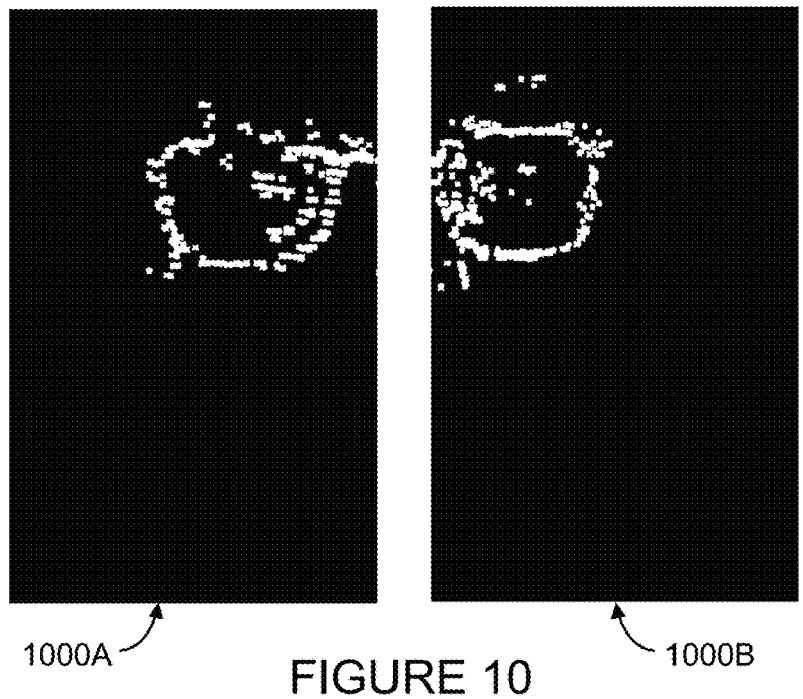
FIG. 10 illustrates the 2D projection of potential eyeglasses points divided into two regions according to various implementations of the invention.

According to various implementations of the invention, a 2D projection of potential eyeglasses points 900 may be divided into a left ocular region and a right ocular region, based on, for example, a location of a nose and/or nose centerline. In some implementations of the invention, dividing the 2D projection of potential eyeglasses points assists with fitting an ellipse to each ocular region thereby separating points that lie on the eyeglasses from those on the face yet close to the eyeglasses. FIG. 10 illustrates the 2D projection of potential eyeglasses points 900 divided into two regions namely a left ocular region 1000A and a right ocular region 1000B.

Figure 11:
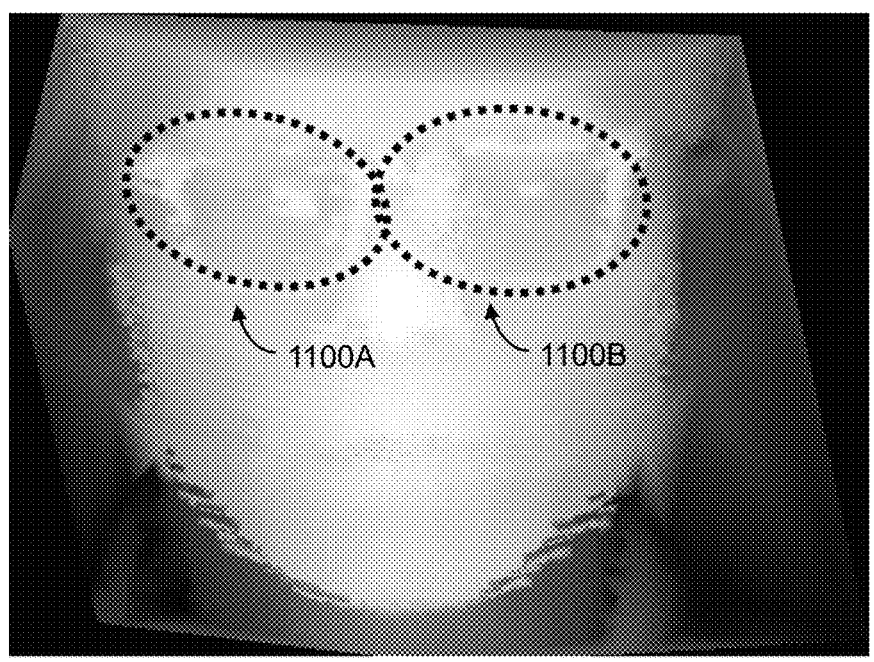
FIG. 11 illustrates respective ellipses subsequently projected onto 2D depth image according to various implementations of the invention.

According to various implementations of the invention, an ellipse is fit to the 2D projection of potential eyeglasses points in each of left ocular region 1000A and the right ocular region 1000B. FIG. 11 illustrates respective ellipses 1100 (illustrated as an ellipse 1100A and an ellipse 11006) subsequently projected onto 2D depth image 400.

Figure 15:
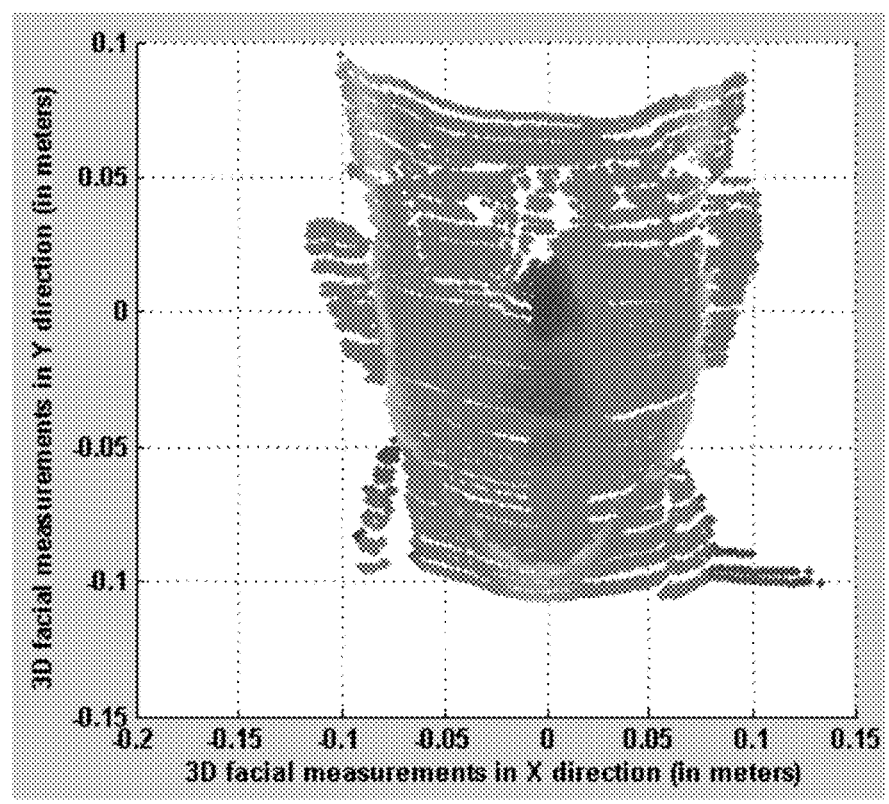
FIG. 15 illustrates a modified 3D scan after having a common occlusion, namely a pair of eyeglasses, removed according to various implementations of the invention.

According to various implementations, all points from 3D scan 300 that conform to both the occlusion model condition and the ellipse fit condition thus described are to be removed from 3D scan 300 as corresponding to eyeglasses. In some implementations, those points from 3D scan 300 that fall on or between the boundary planes or surfaces and that fall within ellipses 1100 are to be removed from 3D scan 300. Removing such points from 3D scan 300 results in a modified 3D scan such as that illustrated in FIG. 15.

Figure 16:
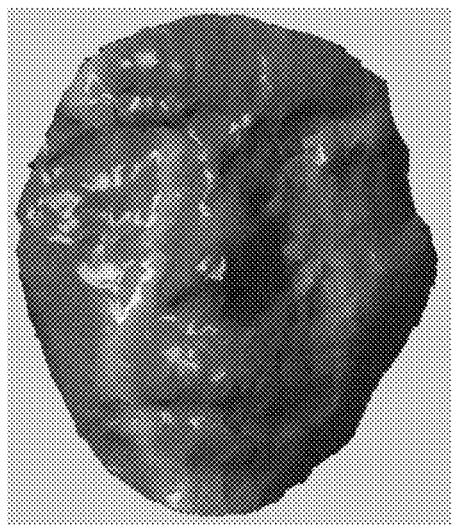
FIG. 16 illustrates a normalized 3D scan after occlusion removal but prior to reconstruction, according to various implementations of the invention.
Figure 17:
FIG. 17 illustrates a normalized 3D scan after occlusion removal and reconstruction, according to various implementations of the invention.

According to various implementations of the invention, once eyeglasses are removed from the 3D scan, some amount of reconstruction may be necessary to fill in missing points or holes in the 3D scan. Such missing points or holes in the 3D scan may subsequently impact the accuracy of some three-dimensional face recognition techniques. In some implementations of the invention, standard techniques may be leveraged to fill in this missing information because good spatial support often exists in the regions of missing information. A few common approaches for reconstructing the missing points or holes in the 3D scan may include linear interpolation, high-order surface interpolation (cubic or quadratic), statistical reconstruction techniques such as Gappy PCA, or suitable in-painting techniques as would be appreciated. Other suitable classes of reconstruction techniques may be utilized as would be appreciated. FIG. 16 illustrates a modified 3D scan before reconstruction and FIG. 17 illustrates a modified 3D scan after reconstruction.

In some implementations of the invention, image comparison module 260 is configured to compare the modified 3D scan to three-dimensional images associated with known subjects, and identify target subject 102 based on the comparison. Image comparison module 260 may compare an entire modified 3D scan to three-dimensional images of known subjects, or may compare portions of modified 3D scan to similar portions of three-dimensional images of known subjects. For example, image comparison module 260 may compare coordinates of an eye region of a modified 3D scan to coordinates of eye regions of the three-dimensional images associated with the known subjects, and identify target subject 102 represented by and/or associated with the modified 3D scan based on the comparison.

Figure 12:
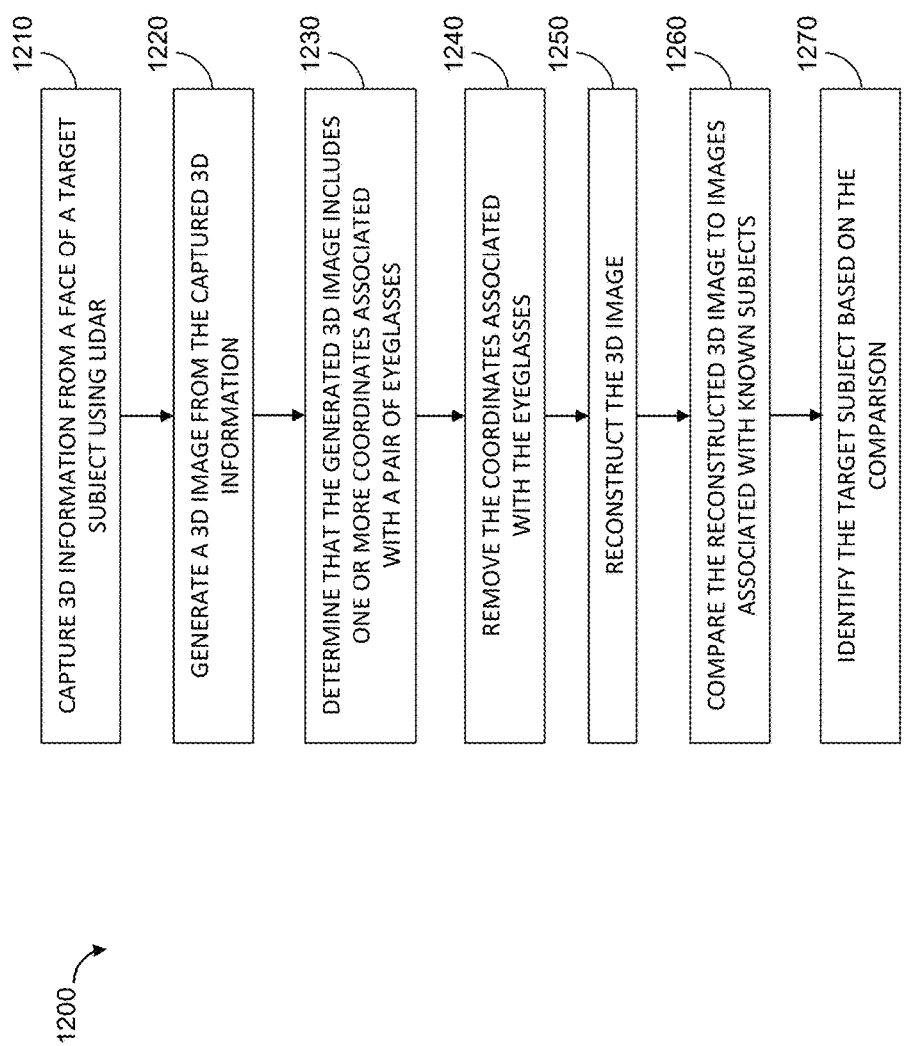
FIG. 12 illustrates an operation of a method for detecting and removing an occlusion from a 3D scan of a target subject according to various implementations of the invention.

As described herein, in some implementations of the invention, face recognition system 105 performs various operations in order to recognize target subject 102, irrespective of whether target subject 102 is or is not wearing eyeglasses or another object occludes its face. FIG. 12 illustrates an operation 1200 of various implementations of the invention that detect and remove an occlusion from a 3D scan of a target subject 102.

In an operation 1210, face recognition system 105 accesses, receives, and/or acquires three-dimensional information (e.g., a 3D scan) from a face of target subject 102 using a lidar system 130. For example, information capture module 210 may receive and/or access coordinate information (e.g., coordinates or other representations of points in three-dimensional space) that is captured and/or measured by lidar subsystem 130 of 3D sensor 110.

In an operation 1220, face recognition system 105 generates a three-dimensional image from the captured three-dimensional information that is representative of the face of the target subject. For example, image generation module 220 may generate a three-dimensional image by building an image or map of the coordinate information representative of various different features of a face of target subject 102.

In operation 1230, face recognition system 105 determines that the generated three-dimensional image includes one or more coordinates associated with an occlusion to the face of target subject 102. For example, occlusion detection module 230 may receive an indication that a two-dimensional image of the target subject depicts glasses worn on the face by the target subject, may select or test one or more coordinates within the three-dimensional image as being indicative of an occlusion (e.g, eyeglasses or other non-facial objects), may receive an indication from an operation of 3D sensor 110 (e.g., a human screener of subjects), and so on.

In operation 1240, face recognition system 105 removes the occlusion from the face of target subject 102. In some implementations of the invention, face recognition system 105 removes the coordinates associated with the occlusion from face of the target subject. For example, occlusion detection module 230 may determine that the occlusion is a pair of eyeglasses worn on the face by target subject 102, identify coordinates associated with a frame of the eyeglasses, and remove the identified coordinates. Operation 1240 is described in further detail with regard to FIG. 13 for instances where the occlusion is eyeglasses.

Figure 13:
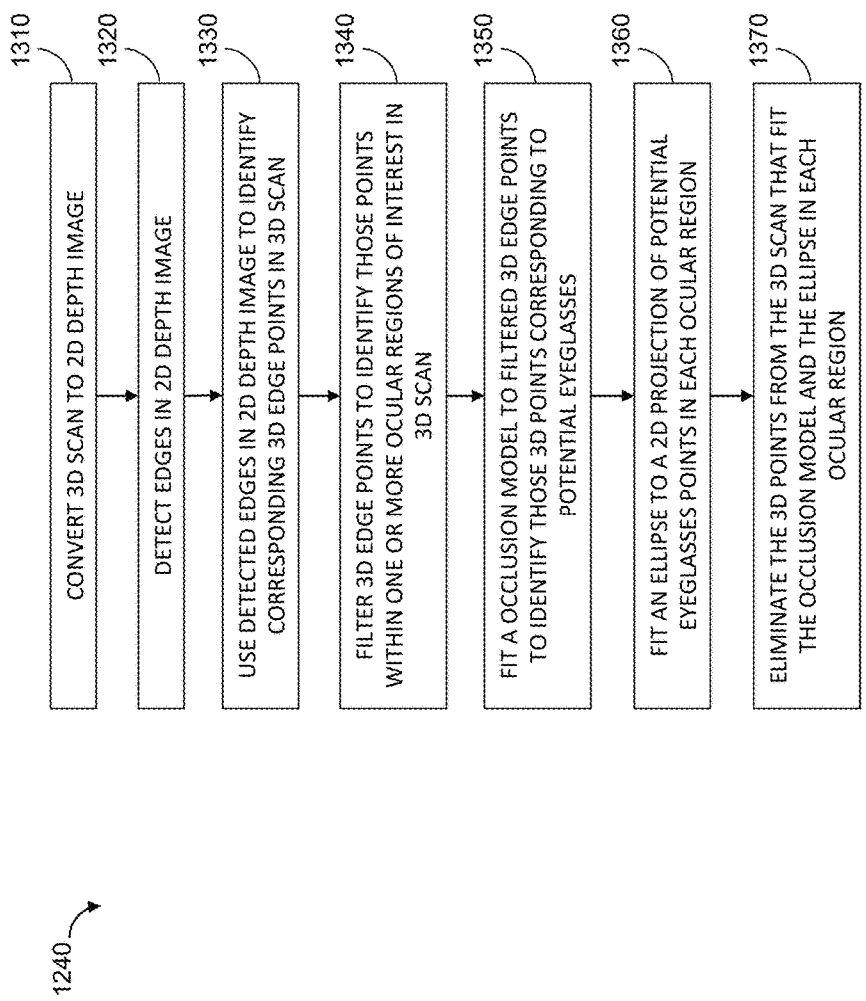
FIG. 13 illustrates an operation of a method for removing coordinates representative of eyeglasses within a 3D scan according to various implementations of the invention.

FIG. 13 illustrates an operation 1240 of a method for removing coordinates representative of eyeglasses within a 3D scan according to various implementations of the invention. In an operation 1300, occlusion detection module 230 converts normalized 3D scan 300 received from lidar system 130 to a 2D depth image 400. In an operation 1320, occlusion detection module 230 conducts edge detection processing on 2D depth image 400 to detect various edge points (including peak points) within 2D depth image 400. In an operation 1330, occlusion detection module 230 maps the edge points back to their corresponding scan points in pose-normalized 3D scan 300 and discards the remaining scan points in pose-normalized 3D scan 300, leaving 3D edge points 600.

In an operation 1340, occlusion detection module 230 filters 3D edge points 600 to identify and retain only those points within an ocular region of 3D scan 300 including the face of target subject 102. In an operation 1350, occlusion detection module 230 fits the filtered 3D edge points 600 to an occlusion model to identify which, if any, fit or fall within a certain distance of such an occlusion model. These points correspond to potential eyeglasses points that reside within 3D scan 300.

In an operation 1360, occlusion detection module 230 projects these potential eyeglasses points into a single plane as a 2D projection of potential eyeglasses points and fits an ellipse, for each of the two ocular regions, to the respective 2D projection of potential eyeglasses points.

In an operation 1370, all points from 3D scan 300 that conform to the occlusion model (or within an acceptable tolerance of the occlusion model), and that fall within either of the ellipses are eliminated from 3D scan 300.

Returning to FIG. 12, in an operation 1250, face recognition system 105 reconstructs 3D scan 300 representative of the face of target subject 102. For example, occlusion removal module 240 may identify an area of 3D scan 300 having coordinates removed therefrom, and image reconstruction module 250 may reconstruct this area of 3D scan 300 by adding coordinates to such area. This process estimates information that was originally occluded (e.g., by eyeglasses) and often benefits face recognition by eliminating holes or gaps in the face surface.

In an operation 1260, face recognition system 105 compares the reconstructed 3D scan to images (either 2D or 3D) associated with known subjects. For example, image comparison module 260 may compare the entire reconstructed 3D scan to images of known subjects, or may compare portions of the reconstructed 3D scan to similar portions of images of known subjects. Exemplary portions of images to be compared include portions or areas of coordinates associated with an eye region of a face, an ear region of a face, a lip region of a face, a nose region of a face, and so on.

In an operation 1270, face recognition system 105 identifies target subject 102 based on the comparison. For example, image comparison module 260 may determine that target subject 102 is a known subject when a threshold number of portions of the three-dimensional image (e.g., a certain percentage of a point cloud) associated with the target subject suitably match portions of a image associated with the known subject.

Thus in some implementations of the invention, the systems and methods described herein may acquire a 3D scan of a face of a target subject from a 3D sensor, where the 3D scan includes multiple coordinates associated with aspects of the face of the subject, identifying coordinates of the 3D scan that are associated with eyeglasses worn on the face of the target subject, and removing the identified coordinates from the 3D scan. The systems and methods may generate a reconstructed image by adding coordinates to the 3D scan in regions that include the removed coordinates.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for removing an occlusion from a three-dimensional scan of a target subject, the method comprising:
   receiving the three-dimensional scan that includes a face of the target subject, the three-dimensional scan comprising a plurality of three-dimensional points;
   determining that the plurality of three-dimensional points includes a subset plurality of three-dimensional points corresponding to the occlusion, the subset plurality of three-dimensional points corresponding to a subset of the plurality of three-dimensional points; and
   removing the subset plurality of three-dimensional points corresponding to the occlusion of the face of the target subject from the three-dimensional scan, wherein removing the subset plurality of three-dimensional points corresponding to the occlusion of the face comprises:
   converting the three-dimensional scan to a two-dimensional depth image;
   detecting edge points in the two-dimensional depth image;
   determining edge points in the three-dimensional scan based on the detected edge points in the two-dimensional scan; and
   filtering the edge points in the three-dimensional scan to identify those edge points inside a particular region of the three-dimensional scan associated with the occlusion.

2. The method of claim 1, further comprising reconstructing the three-dimensional scan to compensate for the removed subset plurality of three-dimensional points.

3. The method of claim 1, further comprising comparing the three-dimensional scan with the removed subset plurality of three-dimensional points against a known image.

4. The method of claim 1, wherein filtering the edge points in the three-dimensional scan to identify those edge points inside a particular region of the three-dimensional scan associated with the occlusion comprises filtering the edge points in the three-dimensional scan to identify those edge points inside an ocular portion of the three-dimensional scan.

5. The method of claim 4, wherein removing the subset plurality of three-dimensional points corresponding to the occlusion of the face further comprises:
   fitting an occlusion model to the filtered edge points to identify those edge points corresponding to potential eyeglasses points.

6. The method of claim 5, wherein fitting an occlusion model to the filtered edge points to identify those edge points corresponding to potential eyeglasses points comprises:
    determining a first boundary that is a first predetermined distance from the occlusion model;
    determining a second boundary that is a second predetermined distance from the occlusion model, wherein the first boundary and the second boundary are on opposite sides of the occlusion model; and
    identifying those edge points that lie on either of the first boundary or the second boundary or that lie in between the first boundary and the second boundary.

7. The method of claim 6, wherein the first predetermined distance is the same as the second predetermined distance but in an opposite direction.

8. The method of claim 5, further comprising:
    fitting an ellipse to each ocular region; and
    identifying those edge points that fall within either ellipses corresponding to the left and right ocular regions.

9. The method of claim 8, further comprising:
    eliminating those edge points identified as falling within either ellipse.

10. The method of claim 8, further comprising:
    eliminating those edge points identified as both fitting the occlusion model and falling within either ellipse.

11. The method of claim 5, further comprising:
    eliminating those edge points identified as fitting the occlusion model.

12. A system for removing an occlusion from a three-dimensional scan of a target subject, the system comprising:
    a 3D sensor configured to acquire a three-dimensional scan of the target subject, the three-dimensional scan of the target including a face of the target subject, the three-dimensional scan comprising at least a range to each of a plurality of points on the target subject; and
    a processor configured to:
        receive the three-dimensional scan from the 3D sensor,
        determine that the three-dimensional scan includes an occlusion to the face of the target subject,
        remove, from the three-dimensional scan, a plurality of three-dimensional points corresponding to the occlusion of the face of the target subject by:
            converting the three-dimensional scan to a two-dimensional depth image,
            detecting edge points in the two-dimensional depth image,
            determining edge points in the three-dimensional scan based on the detected edge points in the two-dimensional scan, and
            filtering the edge points in the three-dimensional scan to identify those edge points inside a particular region of the three-dimensional scan associated with the occlusion.

13. The system of claim 12, wherein the occlusion comprises a hand, a pair of eyeglasses, a hat, a scarf, a cellphone, hair, or a cup.

14. The system of claim 12, wherein the processor is further configured to reconstruct the three-dimensional scan to compensate for the removed plurality of three-dimensional points corresponding to the occlusion of the face of the target subject.

15. The system of claim 12, wherein the processor is further configured to compare the three-dimensional scan with the removed plurality of three-dimensional points against a known image.

16. The system of claim 12, wherein the processor is further configured to compare the reconstructed three-dimensional scan against a known image.

17. The system of claim 12, wherein the processor configured to remove, from the three-dimensional scan, a plurality of three-dimensional points corresponding to the occlusion of the face of the target subject comprises the processor configured to:
    fit an occlusion model to the filtered edge points;
    fit an ellipse to the filtered edge points for each ocular region; and
    eliminate, from the three-dimensional scan, those edge points that both fit the occlusion model and fit either of the ellipses.

18. The system of claim 17, wherein the processor configured to fit an occlusion model to the filtered edge points comprises the processor configured to:
    determine a first boundary that is a first predetermined distance from the occlusion model;
    determine a second boundary that is a second predetermined distance from the occlusion model, wherein the first boundary and the second boundary are on opposite sides of the occlusion model; and
    identify those edge points that lie on either of the first boundary or the second boundary or that lie in between the first boundary and the second boundary.

* * * * *